United States Patent [19]

Wilson

[11] 4,330,413

[45] May 18, 1982

[54] METHOD AND APPARATUS FOR DEWATERING SLURRIES OF COAL AND THE LIKE

[75] Inventor: Donald C. Wilson, San Jose, Calif.

[73] Assignee: FMC Corporation, Chicago, Ill.

[21] Appl. No.: 211,605

[22] Filed: Dec. 1, 1980

[51] Int. Cl.³ ............................................. B01D 33/22
[52] U.S. Cl. .................................... 210/806; 210/388; 210/323.1; 209/234; 209/269
[58] Field of Search ............... 209/233, 234, 269, 274, 209/275, 311; 210/384, 388, 770, 804, 806, 314, 389, 323.1, 499

[56] References Cited

U.S. PATENT DOCUMENTS

| | | | |
|---|---|---|---|
| 2,183,896 | 12/1939 | Rupp et al. | 210/384 X |
| 2,457,018 | 12/1948 | Wantling | 209/267 |
| 2,883,051 | 4/1959 | Maeder | 209/269 |
| 2,982,411 | 5/1961 | Fontein | 210/781 |
| 3,089,582 | 5/1963 | Musschoot et al. | 198/761 |
| 3,135,690 | 6/1964 | Eder | 210/389 |
| 3,929,642 | 12/1975 | Ennis et al. | 209/256 X |

OTHER PUBLICATIONS

Bulletin 220572 FMC Corp., Homer City, Pa., pp. 26-33.
Harris et al., "The Moisture Retention Properties of Fine Coal", Second Symposium on Coal Preparation, Univ. of Leeds (England) 21-25 Oct. 1957.

Primary Examiner—Ralph J. Hill
Attorney, Agent, or Firm—J. M. Heslin; A. J. Moore; R. B. Megley

[57] ABSTRACT

An improved method and apparatus for dewatering particulate coal is disclosed. The apparatus includes a trough having a sump extending longitudinally at the bottom thereof. The trough is mounted on coil springs and an eccentric weight vibratory drive unit acts to convey the mixture of coal and water down said trough. The sump is designed so that a portion of the coal passing down the trough circulates through said sump. The depth of the sump is substantially greater than the capillary rise of water, and the coal thus acts to draw capillary water from the coal supported above in the trough. The coal slowly circulates through the sump in order to avoid the build up of fines therein which would clog the drainage paths through the sump. The sump includes an underlying screen to allow the water to drain therefrom.

17 Claims, 5 Drawing Figures

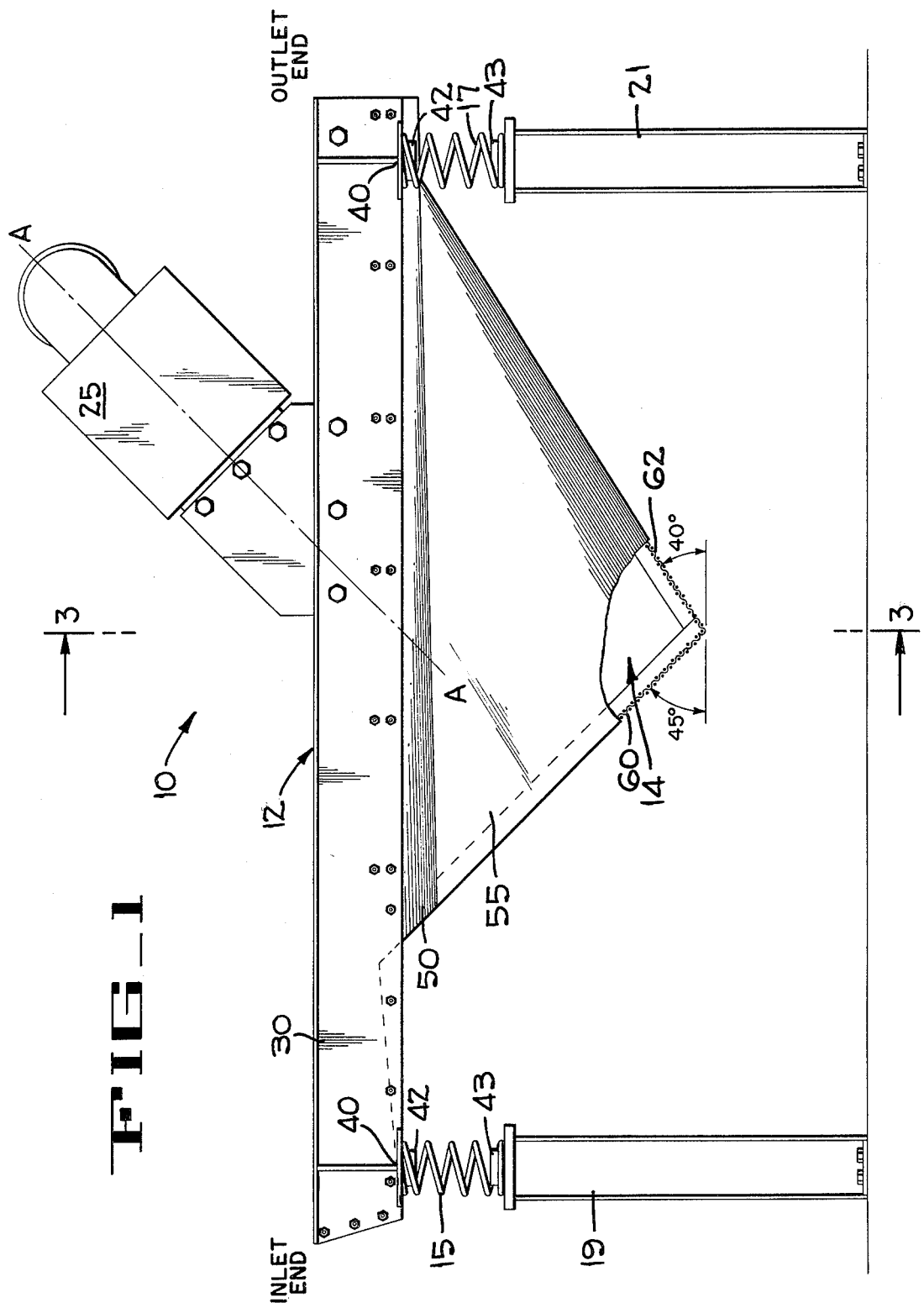

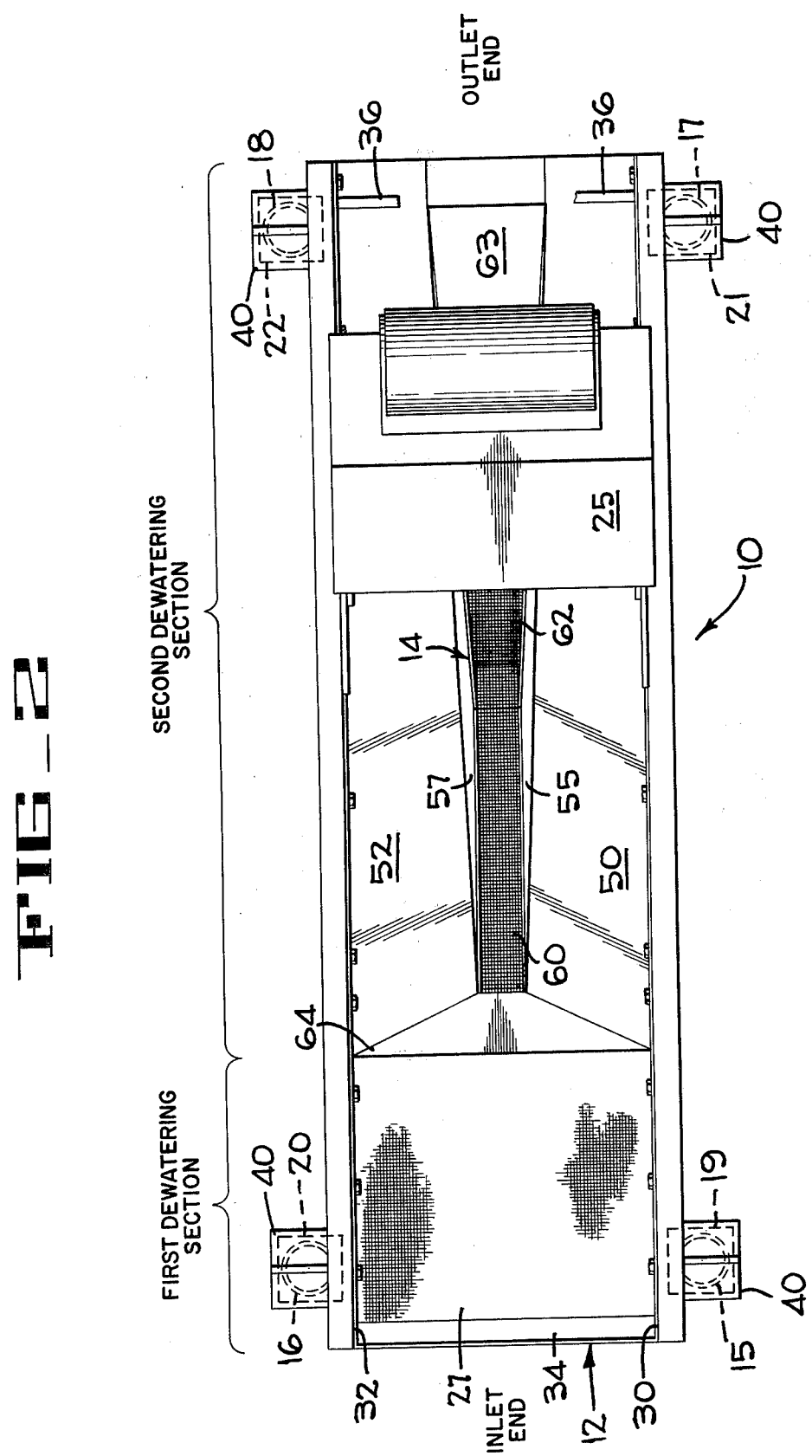

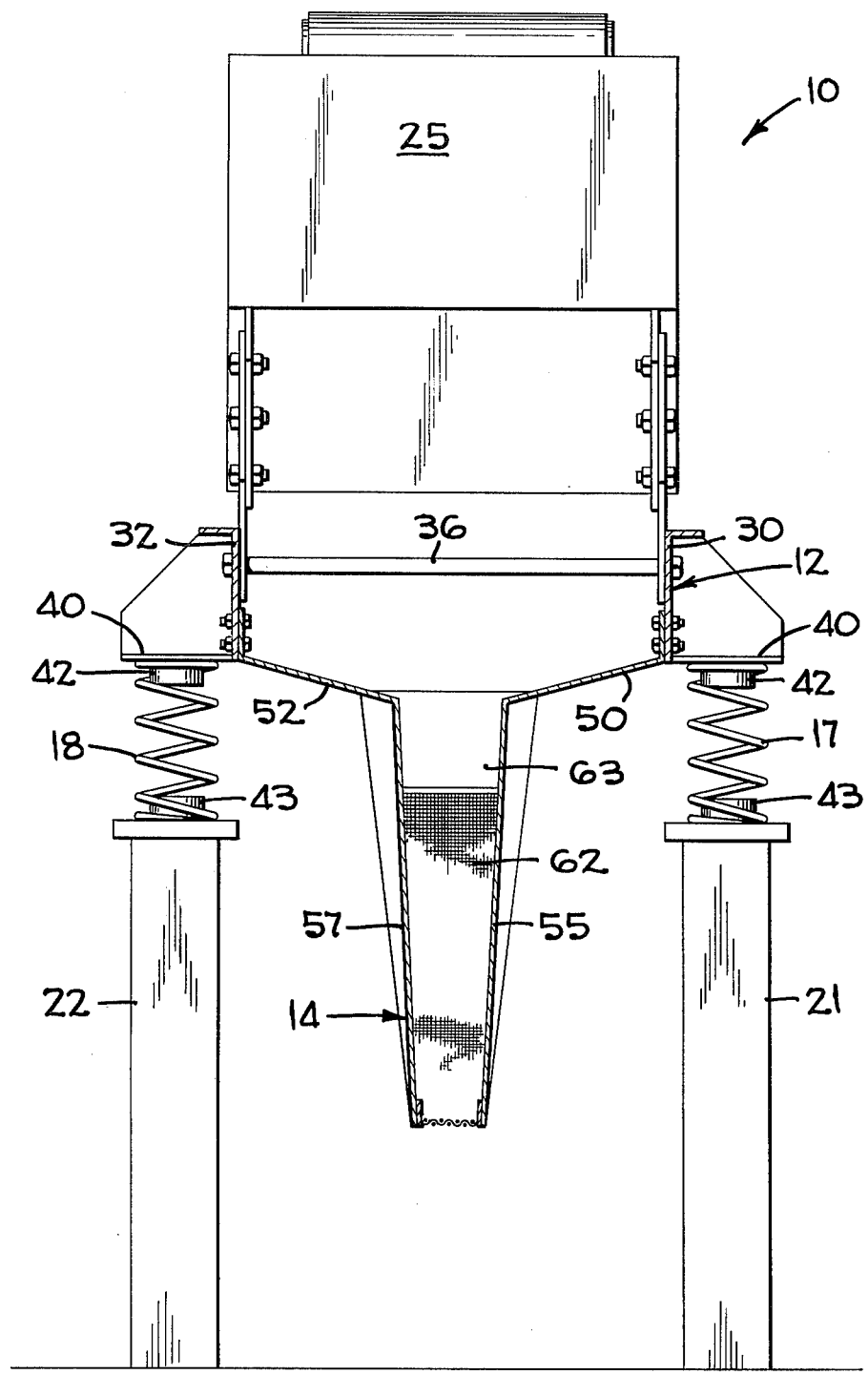

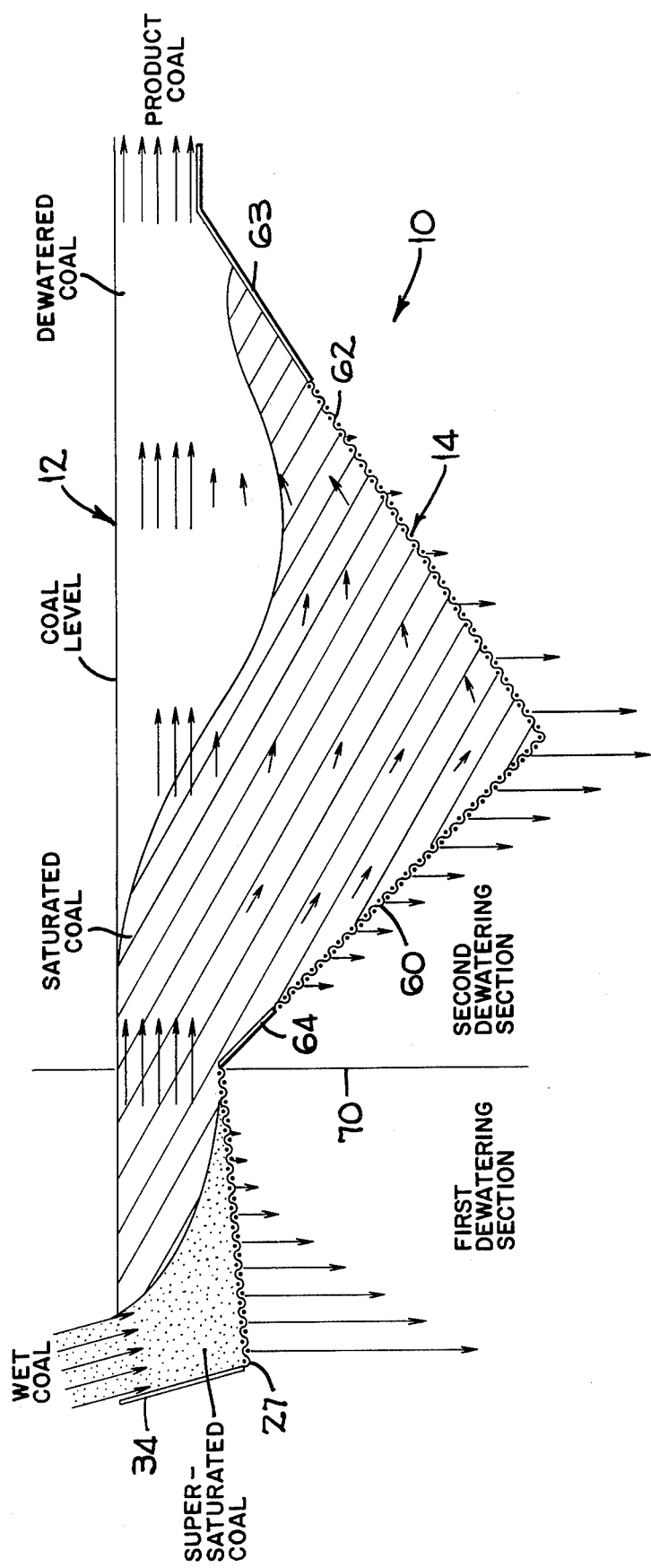

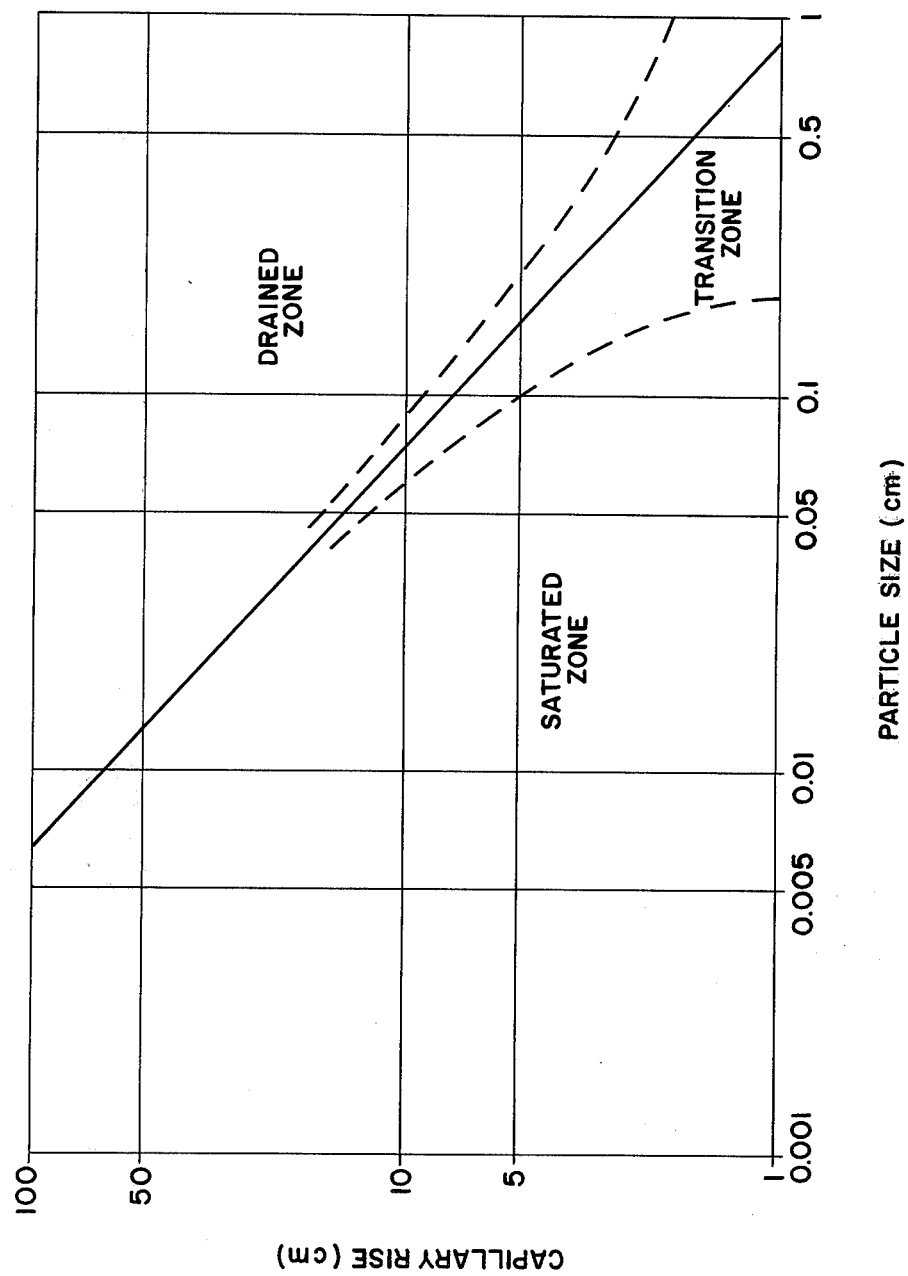
FIG_5

METHOD AND APPARATUS FOR DEWATERING SLURRIES OF COAL AND THE LIKE

BACKGROUND OF THE INVENTION

1. Field of the Invention

The present invention relates to a method and apparatus for removing water from a slurry of particulate material, such as coal, and more particularly concerns an improved vibratory screen apparatus for conveying the coal.

2. Description of the Prior Art

Dewatering is the extraction of surface moisture from particulate coal, where surface moisture is water retained on the surface of a coal particle as contrasted to inherent moisture which is retained within the pores of the coal particle. Modern mining techniques produce a higher proportion of fine coal particles which have a higher surface area to weight ratio than coarser particles produced by earlier techniques. Such fine coal particles are more difficult to dewater than coarse coal particles.

Vibratory screen separators have been used for many years to dewater coal. Such separators typically include a shallow trough having vertical sidewalls and a flat bottom formed of a heavy duty screen, such as a rod screen having a size in the range from ¼ mm to 1 mm openings. The trough is mounted on coil or leaf springs, known as isolator springs, and a vibratory drive unit, such as one including eccentric weights, is attached to the trough so as to induce oscillations along a predetermined axis. A layer of coal several inches thick is conveyed across the screen by the oscillations, in the well-known manner of vibratory conveyors, and is discharged over the end. The vibrating action helps dewater the coal, but because of the water retention characteristics of particulate coal, it is difficult to lower the surface moisture content below 20% based on the dry weight of the coal. An example of such a vibrating screen separator is the model SF-66 vibrating screen feeder manufactured by the FMC corporation, Homer City, Pennsylvania and described in Bulletin 220572 (pp. 26-33). A similar separator is described in U.S. Pat. No. 2,457,018 to Wantling.

The phenomenon of water retention in beds of particulate coal has been described by C. C. Harris and H. G. Smith in a published paper presented to the Second Symposium of Coal Preparation at the University of Leeds (England), Department of Mining, Oct. 21-25, 1957. The authors identified four distinct modes of water retention. The first such mode is denominated free moisture. Free moisture is that water which will freely drain from the coal as soon as a drainage path is available. Thus, free moisture is not "retained" by the coal at all. The remaining three modes described by Harris and Smith act to retain moisture in the interstices between adjacent particles even when the water is otherwise free to drain.

The second of the modes described by Harris and Smith is the capillary mode wherein water is held in the narrow passageways between particles by capillary action. The amount of water retained by capillary action is limited and depends on both the force pulling down on the water (normally gravity) and on the average diameter of the capillary-like passages. For a true capillary having a circular diameter d at its top, the height h of the liquid column is:

$$h = \frac{4 \, v \cos \theta}{l \, g \, d}$$

where,
h = height of liquid column
v = surface tension of liquid-solid interface
θ = contact angle of liquid solid interface
d = diameter of capillary tube at top
l = liquid density
g = gravitational constant The third mode described is the funicular mode. Without further describing this mode, it is noted that the water held in this mode is released when the water held in the capillary mode surrounding it is released.

The final mode described is the pendular mode. In this mode, water is held in discrete rings surrounding the contact points between adjacent particles. To release water retained in this mode it is necessary to break contact between the adjacent particles. Harris and Smith estimate that approximately 20 percent of the retained surface moisture (i.e., surface moisture other than free moisture) is held in the pendular mode, while the remaining 80 percent is held in either the capillary or funicular mode.

The prior art vibrating screen separator described hereinbefore removes only free water from the wet coal feed and the product stream therefrom still contains the water retained in the remaining three modes just described. To remove such retained water, additional means must be used. One approach commonly employed is to provide a vacuum chamber beneath the vibrating screen to draw out the retained water. Such a vacuum dewatering system is disclosed in U.S. Pat. No. 3,929,642 to Ennis et al. An alternate approach is to provide a centrifuge downstream of the vibrating screen.

SUMMARY OF THE INVENTION

The present invention provides an improved method and apparatus for removing surface water, including capillary water, from particulate material, such as particulate coal. According to the present invention, a mixture of the particulate material and the entrained liquid is fed to a trough having a bottom wall for supporting said mixture. An elongate sump is formed longitudinally in said bottom wall and is opened at the top to receive material from said trough. The sump has a depth at its lowest point well in excess of the capillary rise of the liquid within the particulate material and the lowest portion of said sump includes a perforated wall to allow drainage of liquid from the mixture.

The mixture of particulate material and liquid is continuously fed to one end of the apparatus. The apparatus, which is resiliently mounted, is vibrated in a predetermined direction in order to convey the mixture longitudinally to a discharge end thereof. The sump is adapted so that a portion of the mixture passing through the trough circulates slowly through said sump before reaching the discharge end of the trough. The coal in the sump acts as a blotter or a wick to draw capillary water from the coal in the trough and thereby dewater said coal.

BRIEF DESCRIPTION OF THE DRAWINGS

FIG. 1 is a side elevation of the improved vibratory screen apparatus of the present invention.

FIG. 2 is a plan view of the apparatus of FIG. 1.

FIG. 3 is a section taken on line 3—3 of FIG. 1.

FIG. 4 is a diagrammatic section taken along the longitudinal axis of the apparatus and illustrating the flow of coal and water therethrough.

FIG. 5 is a chart which correlates the particle size of various coal samples with the capillary rise for such samples.

DESCRIPTION OF THE PREFERRED EMBODIMENT

It should first be noted that although the following description will relate to an apparatus for dewatering suspensions of particulate coal in water, the liquid-solid separation principles of the present invention are applicable to removing liquids from other particulate materials having a fine particle size. Generally, the present invention is intended for separating liquid from particulate materials having a particle diameter of ⅜ inch, or less.

The following terms will be used throughout this specification. The surface moisture of a coal sample is the amount of water which is retained on the surface of the particulate coal. The inherent moisture of a particulate coal sample is the water that is retained in the pore structure of the coal. The inherent moisture is a characteristic of the coal seam and is constant for any particular coal seam. The value of the surface moisture of a sample is obtained by subtracting the known inherent moisture from the total coal moisture of the sample. To obtain the total moisture of the various samples cited hereinafter, the samples were dried in an oven at 100° C. for sixteen hours. The inherent moisture of a sample was obtained by finding the amount of water that said oven-dried coal sample gained when held in a 100% relative humidity for a period of twenty-four hours. As used hereinafter, the surface moisture values are calculated on a wet basis, i.e., $$\% \text{ surface moisture} = \frac{\text{wt. of surface moisture}}{\text{wt. of coal including total moisture}}$$

A distinction is also made hereinafter between three types of surface moisture. Free water is that water which is free-flowing within an agglomerate of particles under the force of gravity. Capillary water is that water which is held by capillary attraction forces between the particles of the agglomerate. The term capillary water will also be used hereinafter to include the surface water retained in the funicular mode, as described by Harris and Smith. This simplification is introduced since the funicular water becomes free flowing as soon as the capillary water is released. Finally, the term pendular water will refer to water held in the pendular mode.

The present invention is an improved method for removing the capillary water in a bed of particulate solids and includes the use of a vibrating screen separator. As stated previously, the vibrating screen separators of the prior art have been able to remove the free water from coal, while leaving the capillary water and pendular water in place. As described fully hereinafter, the present invention improves the vibrating screen separator so that the capillary water is largely removed, leaving only the pendular water on the surface of the coal particles.

Removal of the capillary water is accomplished by providing a slowly circulating bed of coal beneath a more rapidly travelling primary bed of coal. The lower bed of coal acts as a wick or a blotter in drawing the capillary water from the upper bed. The water drawn out by the lower bed of coal is discharged through a supporting screen, and the coal in the lower bed is circulated and slowly discharged in order to avoid the build-up of very fine particles which would block the passage of water through the lower bed.

According to the present invention, it is critical that the lower layer of coal be maintained at a depth which is substantially greater than the capillary rise of the liquid in the particulate material. Such capillary rise may be determined by a simple test. A representative sample of the particulate material, for example coal, is placed in a transparent tube having a screen at its lower end so as to form a column of coal within the glass tube. The tube is then immersed in water to a depth equal to or greater than the depth of the coal sample within the tube so that the column of coal is completely saturated with water. Then the tube is raised to a height such that the screen is still immersed in the water but substantially all the coal sample is above the surface of the water. Free water will drain from the sample leaving the surface water, including the capillary water, the funicular water and the pendular water as described hereinbefore. The portion of the sample retaining capillary water will appear saturated (water contacting the tube wall) and the portion above the capillary rise will appear drained (air at the tube wall). Thus, it is easy to measure the height of the capillary rise for a given sample of coal. It will be noted that a rather narrow transition zone is formed between the drained and the saturated zones of the column of the sample, with the thickness of the transition zone varying according to the sizes and shapes of the interstices in the bed sample.

FIG. 5 is a chart indicating the capillary rise of various samples of coal having different particle sizes. The capillary rise measurements indicated in FIG. 5 were made according to the procedure described in the preceding paragraph. The coal samples were carefully screened into size fractions with the ratio of the largest to smallest particle size in each sample being less than the square root of two. The coal samples had particles which were for the most part cubic with some being tabular. The particles sizes indicated on the abscissa of FIG. 5 indicate the largest dimension of the individual particles in the size fractions tested. The transition zone at any given particle size is indicated by the vertical distance between the dashed lines in FIG. 5.

FIG. 5 shows that the capillary rise of water in fine coal varies inversely with the particle size. Interestingly, however, the retention of surface moisture by coal was found to be relatively independent of particle size. The saturated zone of the coal sample had a fairly constant surface moisture of approximately 36% by weight (wet basis). Above the capillary rise level, the surface moisture consisted of pendular water only which comprised approximately 6% by weight.

FIG. 5 is a useful indication of the capillary rise which may be expected in coal in a particular size range. The actual capillary rise observed in coal supported in a vibratory separator, however, will be affected by a number of variables including the degree of particle packing, water temperature, actual size distribution, and others. For this reason, it is desirable to provide a lower layer of coal having a depth well in excess of the capillary rise indicated by FIG. 5 for coal in the size range to be dewatered.

Attention is now directed to FIGS. 1-3 wherein a vibratory screen apparatus 10 for dewatering fine particulate coal material is illustrated. Generally, the vibratory dewatering apparatus 10 includes a trough 12 having a deep sump 14 formed longitudinally in a portion thereof. The trough 12 is supported at its own corners on isolation springs 15-18 which in turn are supported on posts 19-22, respectively.

The trough is vibrated by a conventional dual eccentric weight exciter unit 15 which is mounted on the trough so that the angle of attack of the exciter, as indicated by the line A—A in FIG. 1, is approximately 45° relative to the plane of the trough. The trough 12 includes a first dewatering section which is situated at the inlet end of the trough to the left as viewed in FIGS. 1 and 2. The trough 12 also includes a second dewatering section which includes the sump 14. The free water is substantially removed in the first dewatering section which includes a conventional dewatering screen 27 (FIG. 2) at the bottom thereof. The capillary water is removed in the second dewatering section.

As shown in FIGS. 1-3, the trough 12 includes a first side wall 30 running the length of the apparatus, a second sidewall 32 running parallel to the first sidewall on the opposite side of the apparatus and an end wall 34 at the inlet end extending transversely between the sidewalls. A rod 36 extending between the sidewalls 30, 32 at the outlet end of the apparatus 10 completes a rectangular frame which is the primary structural unit of the apparatus. Suspended from this frame are the sump 14 and the conventional dewatering screen 27. The exciter unit 25 is mounted on top of the frame. The frame, in turn, is suspended on four mounting brackets 40, one located at each corner. The mounting brackets 40 are welded to the sidewalls and extend perpendicularly therefrom. Each mounting bracket 40 has a disc 42 mounted on its lower surface for engaging the upper end of the associated isolation spring 15, 16, 17 or 18. The lower ends of each of said isolation springs are attached to the associated support post 19, 20, 21 or 22 by a second fastening disc 43.

In the first dewatering section of the trough 12, which section occupies approximately the first one-quarter of the length of the apparatus 10, the conventional dewatering screen 27 extends between the lower ends of the sidewalls 30,32 and is attached thereto. The screen 27 is typically a rod-type screen having a flat profile. One such screen is the Grizzly-Rod screen manufactured by the Bixby-Zimmer Engineering Co. of Galesburg, Illinois.

The second dewatering section of the trough 12 includes the sump 14, as shown in FIGS. 1, 2, and 3. A first bottom panel 50 extends inward from the first sidewall 30 and is attached to the lower end thereof. A second bottom panel 52 extends inward from the second sidewall 32 and is attached to the lower end thereof. The two bottom panels are inclined downward as they approach the center forming an angle of approximately 15° with the horizontal. Note that both bottom panels 50 and 52 are imperforate.

The sump 14 is formed between the two bottom panels 50,52 and includes two imperforate walls 55,57 which extend generally downward from the inner longitudinally extending edges of the bottom panels 50 and 52, respectively. Each wall has a triangular profile as best observed in FIG. 1. A narrow rectangular screen 60 is supported between the forward (i.e., to the right as viewed in FIG. 1) edges of the walls 55,57. A trapezoidal screen 62 is supported between the rearward edges of the walls 55,57 with its lowermost end in abutting relationship with the lowermost end of of screen 60 (FIG. 1) so as to form a continuous screen across the bottom of the sump. As observed in FIG. 3, the trapezoidal screen 62 does not extend fully up the sump, and an imperforate plate 63 is located at the upper end. A trapezoidal plate 64 (FIG. 2) is located at the forward end of the second dewatering section and acts as a transition between the flat screen 27 and the downwardly sloping bottom panels 50,52.

The orientation of both the screen 60 and the screen 62 relative to the oscillatory drive angle of the exciter unit determines the circulation rate of coal through the sump 14. As stated earlier, it is desirable to provide a slow circulation in order to avoid build-up of fines which block necessary drainage paths through the sump 14. In the preferred embodiment, the screen 60 is oriented perpendicularly to the oscillatory line A—A of the exciter unit 25. Thus, contact between the screen 60 and the coal in the sump 14 imparts little or noe circulatory motion to the coal since no component of the oscillation lies along the screen. The screen 62 lies at an angle 5° closer to the horizontal than the oscillatory line A—A, thus providing a small upward force component for coal lying along said screen. In this way, a small circulatory motion is imparted to coal which causes the coal to slowly rise along the screen 62. The diagram of FIG. 4 is a velocity profile showing the relative velocity of coal at different points in the trough 12 and sump 14. The length of the arrows indicates the magnitude of the velocity and the direction of the arrows indicates the direction of the velocity.

The sump 14 is flared outwardly in both the horizontal and vertical planes, as illustrated in FIGS. 2 and 3. Thus, the minimum spacing between the walls 55, 57 is found along the forward edges of said walls, while the maximum spacing is found at the rearmost corner of the triangular walls. The flaring is provided to allow the coal to circulate freely through the sump 14 while the apparatus is being operated.

Typically, the trough of the apparatus will be 4 feet wide. The first dewatering section will have a length in the range from 3 feet to 5 feet and the second dewatering section will have a length in the range from 8 feet to 12 feet. The width of the sump screen 60 will be approximately 8 inches which is also the minimum width of the trough. The trough 12 opens up to a width of approximately 20 inches at the upper, rear corner thereof. Note that these dimensions may vary. The width of the sump 14 may be lessened so long as it allows sufficient drainage. The width of the sump 14 may be increased so long as sufficient support is provided by the coal in the sump 14 for the coal moving more rapidly through the upper portion of the trough 12. It is desirable to minimize the width of the screen to minimize the mass of coal to be vibrated.

The depth of the sump 14 is typically 20 inches at its lowest point. This is well in excess of the capillary rise for nominal 28 mesh coal. Referring to FIG. 5, the capillary rise for 28 mesh (0.05 cm) coal is approximately 6 inches (15 cm). For finer particles, the depth of the sump should be increased.

The exciter unit 25 is a conventional rotary vibratory drive unit. The unit 25 includes one or more sets of eccentric weights driven by an electric, pneumatic or hydraulic motor. The unit 25 may be resiliently mounted on the frame of the apparatus in order to isolate vibrations which do not lie along the oscillatory drive line A-A. Such a drive unit and mounting means are described In U.S. Pat. No. 3,583,553 to W. V. Spurlin et al or U.S. Pat. No. 3,089,582 to Masschoot et al. An adjustable speed control may be provided for adjusting the frequency of oscillation, the magnitude of oscillation, or both, in order to control the throughput of coal. Such speed control units are well known in the prior art and will not be further described.

Referring to FIG. 4, the operation of the apparatus of the present invention will now be described. Wet coal is fed to the apparatus at the inlet end thereof viewed to the left on FIG. 4. The wet coal, which may have a moisture content exceeding 40% by weight (wet basis), enters the first dewatering section of the apparatus where substantially all free water is removed therefrom. As described earlier, the bottom of the first dewatering section is a rod screen 27 inclined up from the horizontal at about 5°. As the coal travels up the screen, the supersaturated zone of coal (indicated by the shaded area on FIG. 4) diminishes and the saturated zone (indicated by the cross-hatching) increases.

As the coal enters the second dewatering section (located to the right of line 70 on FIG. 4), substantially all free water has been removed therefrom. The majority of coal entering the second dewatering section will travel through the trough 12. A small portion of said coal, however, will flow through the sump 14 as indicated by the shorter arrows on FIG. 4. As described earlier, the small portion of coal slowly circulates through the sump joining the main coal stream near the outlet of the apparatus located at the right of FIG. 4.

Immediately as the coal enters the second dewatering section, capillary water begins to drain from coal in the trough 12 through the coal in the sump 14. Such drainage is indicated by the vertical arrows drawn at screen 60. The water drains from all portions of the coal; however, the drained strata of coal first appears at the top and gradually extends downward. The zone of dewatered coal is indicated on FIG. 4 as a blank area above the saturated coal. The height of the zone of dewatered coal increases as the coal travels toward the outlet end of the apparatus. Very close to the outlet end, however, the height of the zone decreases. This is because the depth of the coal bed in the sump 14 decreases along the length of the bed 12. The upper coal level in the apparatus remains substantially constant as the coal travels through said apparatus.

Although the best mode contemplated for carrying out the present invention has been herein shown and described, it will be apparent that modification and variation may be made without departing from what is regarded to be the subject matter of the invention.

What is claimed is:

1. A vibratory screen apparatus for continuously separating a liquid from a mixture of said liquid and a particulate material containing liquid by capillary action, said apparatus comprising:
   means defining a trough for receiving the mixture at an inlet end thereof and for discharging the particulate material with substantially all water removed therefrom at an outlet end thereof, said trough having a bottom wall and two side walls;
   means for oscillating the trough in a predetermined plane in order to convey an upper layer and a lower layer of the particulate material from the inlet end of the trough to the outlet end of the trough;
   means defining an elongated sump formed in the bottom wall of the trough, said sump means being open at the top in order to receive said lower layer of the mixture conveyed in the trough, said sump means including a bottom opening disposed in a gaseous atmosphere and being located at a depth which is substantially greater than the capillary rise of liquid in the particulate material for causing the second layer to draw free and capillary liquid from the first layer, said sump having a width which increases in the outlet direction of the apparatus and decreases in the downward direction, said sump having a width at the top which is approximately one-third or less of the width of the trough; and
   a screen covering said bottom opening, said screen allowing the liquid to drain from the mixture as the particulate material is being conveyed from the inlet to the outlet of the trough.

2. A vibratory screen apparatus for continuously separating a liquid from a mixture of said liquid and a particulate material, said apparatus comprising:
   a trough for receiving the mixture at an inlet end thereof and for discharging the particulate material with substantially all water removed therefrom at an outlet end thereof, said trough having a bottom wall and two side walls;
   means for oscillating the trough in a predetermined plane in order to convey the mixture from the inlet end of the trough to the outlet end of the trough;
   a sump formed in the bottom wall of the trough, said sump being open at the top thereof in order to receive a portion of the mixture conveyed in the trough; and
   a screen located at the bottom of the sump, said screen allowing the liquid to drain from the mixture;
   said sump additionally including two side walls which are substantially parallel with the side walls of the trough; a first length of the screen being supported between said sidewalls and being substantially perpendicular to the direction of oscillation of the trough, and a second length of the screen being generally parallel to the plane of oscillation of the trough.

3. A vibratory screen apparatus as in claim 2, wherein the second length of screen is oriented 5 degrees closer to horizontal than the plane of oscillation of the trough so that the oscillation imparts momentum to the mixture in the sump in order to circulate the mixture therein.

4. A vibratory screen apparatus as in claim 2 or 3, wherein the width of the sump increases in the outlet direction of the apparatus and decreases in the downward direction.

5. A vibratory screen apparatus as in claims 2 or 3 wherein the width of the sump at the top thereof is approximately one-third or less of the width of the trough.

6. A vibratory screen apparatus for continuously separating a liquid from a mixture of said liquid and a particulate material, said apparatus comprising:
   a trough having a first dewatering section and a second dewatering section, said first dewatering section including a screen for supporting a bed of the mixture, said second dewatering section including a bottom wall for supporting the bed of the mixture after said mixture is discharged from the first dewatering section;

a sump formed in the bottom wall of the second dewatering section, said sump having two sidewalls spaced apart transversely and longitudinally aligned with the trough;

a screen for supporting a portion of the mixture as said mixture passes through the second dewatering section, said screen supported between the sidewalls of the sump and forming the bottom thereof; and means for oscillating the trough in a predetermined plane in order to convey the mixture through the apparatus.

7. A vibratory screen apparatus as in claim 6, wherein the depth of the sump is greater than the depth of the capillary rise of the liquid within the particulate material.

8. The improved apparatus of claim 7, wherein said sump includes two sidewalls spaced transversely apart and extending generally downward from the bottom wall of the trough, a first bottom screen extending between said sidewalls and oriented generally perpendicularly to the direction of oscillation of the trough, and a second bottom screen extending between said sidewalls and oriented generally parallel to the direction of oscillation of the trough.

9. The improved apparatus of claim 8, wherein the plane of the second bottom screen lies at an angle approximately 5° below the direction of oscillation so that the oscillation imparts momentum to the coal which causes said coal to travel upwardly out of the sump.

10. A method of separating a liquid from a mixture of that liquid and a fine particulate material, wherein the mixture is conveyed by vibrating action along a path through a trough, said method comprising the steps of:

continuously feeding the mixture to one end of said trough to form a first layer of the mixture in the trough;

forming a second lower layer of the mixture of reduced transverse dimension in the trough, said second layer having a depth greater than the capillary rise of the liquid in the particulate material in the slurry, whereby the second layer acts to continuously draw capillary liquid from the first layer;

draining liquid from the bottom of the second layer; and withdrawing particulate material from which the liquid has been removed from the opposite end of the trough.

11. A method of continuously separating surface water from a stream of particulate material comprising the steps of:

feeding a stream of the particulate material mixed with the liquid to one end of a trough having a bottom wall, said bottom wall having a recessed portion therein, oscillating the trough in a direction which is oblique to the plane of the trough to thereby advance the material in a direction toward the other end of the trough;

forming a top layer of the material upon said bottom wall which top layer travels down the trough at a predetermined rate;

forming a bottom layer of the material within said recessed portion which travels through the recessed portion of the bottom wall of the trough at a relatively slower rate than the top layer travels through the trough, whereby said slower moving bottom layer draws surface water held in the top layer into the bottom layer; and draining the surface water from the bottom layer of material.

12. An apparatus for separating a liquid from a particulate material containing free liquid and liquid by capillary action, comprising: trough means and sump means for advancing the particulate material and liquid along a path having an upper layer advancing at one average rate and a lower layer advancing at another average rate, said lower layer having a depth greater than the capillary rise of the liquid in the particulate material, screen means disposed in a gaseous atmosphere for supporting and permitting the liquid to drain from the bottom of the lower layer, and means for discharging the particulate material from which the free liquid and capillary liquid has been removed, said lower layer of the particulate material being in said sump means and acting to draw free and capillary liquid from the particulate material in the upper layer before discharge of said particulate material, said sump having a width which increases in the outlet direction of the apparatus and decreases in the downward direction, said sump having a width at the top which is approximately one-third or less of the width of the trough.

13. An apparatus according to claim 12 wherein the particulate material is coal and the liquid is water.

14. An apparatus according to claim 12 wherein the lower layer is narrower than the upper layer transversely of the direction of advancement of the particulate material.

15. A method of separating a liquid from a particulate material containing liquid by capillary action comprising the steps of: advancing the particulate material and liquid along a path having an upper layer advancing at one average rate and a lower layer advancing at a slower average rate and having a depth greater than the capillary rise of the liquid in the particulate material, said lower layer of particulate material drawing capillary liquid from the upper layer, draining liquid from the bottom of the lower layer, and separately discharging the liquid and the particulate material from which capillary liquid has been removed.

16. A method according to claim 15 wherein the particulate material is coal and the liquid is water.

17. A method according to claim 15 wherein the lower layer is narrower than the upper layer transversely of the direction of advancement of the particulate material.

* * * * *